United States Patent [19]

Podlewski

[11] 4,212,055
[45] Jul. 8, 1980

[54] CONTROL FOR AN INVERTER STATION

[75] Inventor: Johann Podlewski, Berlin, Fed. Rep. of Germany

[73] Assignee: Licentia Patent-Verwaltungs-G.m.b.H., Frankfurt am Main, Fed. Rep. of Germany

[21] Appl. No.: 932,113

[22] Filed: Aug. 9, 1978

[30] Foreign Application Priority Data

Aug. 11, 1977 [DE] Fed. Rep. of Germany ....... 2736540

[51] Int. Cl.² .............................................. H02M 7/00
[52] U.S. Cl. ........................................ 363/71; 363/96
[58] Field of Search .................................. 363/52–58, 363/68, 71, 96

[56] References Cited

U.S. PATENT DOCUMENTS

| 3,280,334 | 10/1966 | Uhlmann et al. | 363/68 X |
| 3,530,362 | 9/1970 | Filimonov et al. | 363/68 |
| 3,962,624 | 6/1976 | Ostlund et al. | 363/68 |
| 4,084,206 | 4/1978 | Leowald et al. | 363/57 X |
| 4,084,221 | 4/1978 | Ogata | 363/68 X |

FOREIGN PATENT DOCUMENTS 575725  9/1975  U.S.S.R. .................................... 363/68

Primary Examiner—William M. Shoop

Attorney, Agent, or Firm—Spencer & Kaye

[57] ABSTRACT

In the operation of a control arrangement for the direct voltage of an inverter station which inverter station includes a plurality of thyristor bridges which are connected in series at their direct voltage side and connected to a three-phase mains via a plurality of variable ratio transformers each individually associated with a respective thyristor bridge, a plurality of extinction angle circuits each associated with a respective thyristor bridge, and a total control circuit for controlling the voltage of all thyristor bridges together, the control circuit providing an output corresponding to the direct voltage of the inverter station and responding to a setting value representative of the transformer stage adjustment which operates in synchronism for all thyristor bridges, the control arrangement is matched to the control path by comparing a measured value which corresponds to the direct bridge voltage of each thyristor bridge with the instantaneous maximum value of the measured values for all thyristor bridges, and, whenever a measured value differs from the maximum value by more than a predetermined amount, instantaneously switching off the respective thyristor bridge and correspondingly matching the control value for the transformer stage adjustment and the circuit gain of the total control circuit.

2 Claims, 1 Drawing Figure

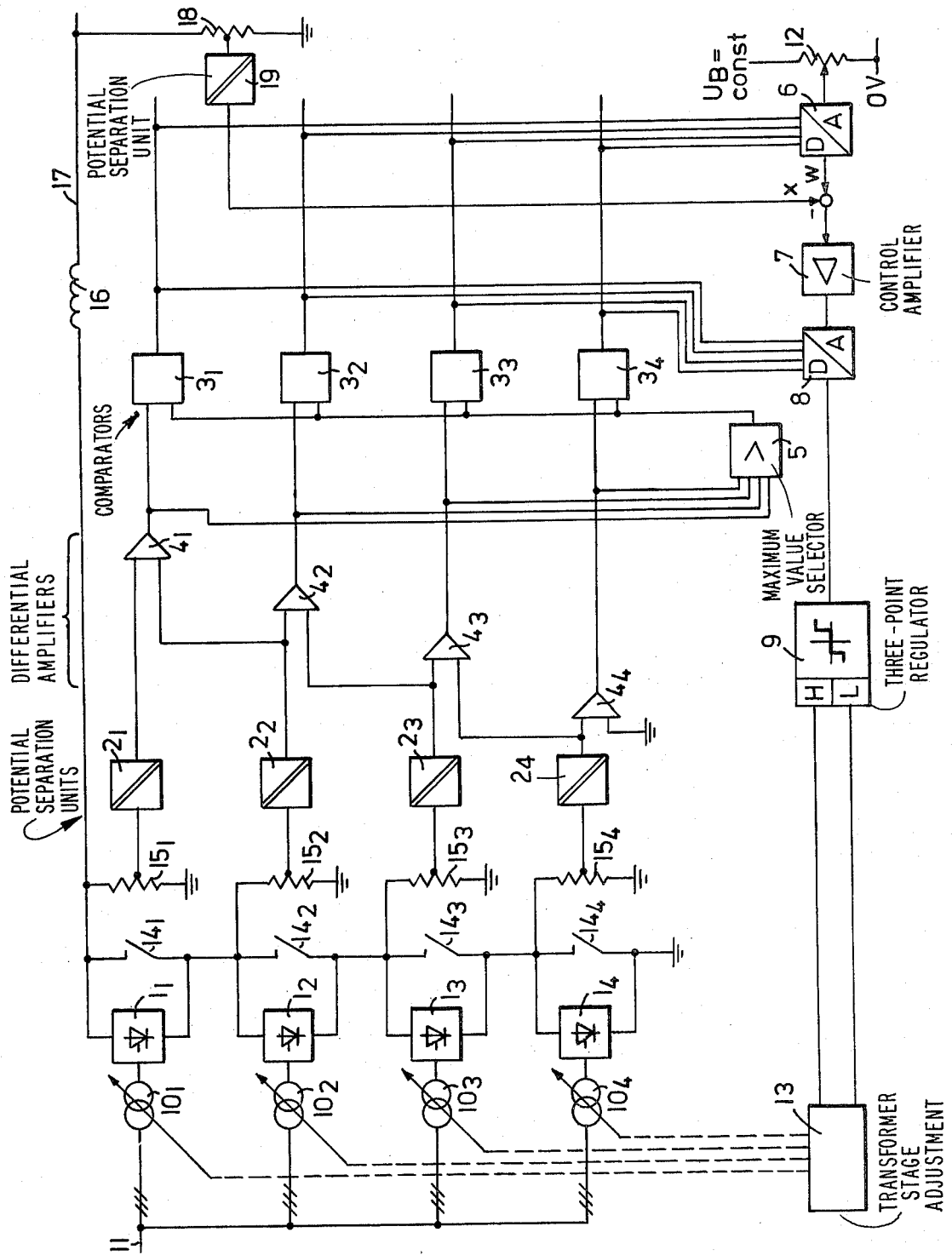

CONTROL FOR AN INVERTER STATION

BACKGROUND OF THE INVENTION

The present invention relates to a method for matching the direct voltage control unit of an inverter station to the control path, in a system in which the inverter station includes n thyristor bridges connected in series at their direct voltage ends and connected to a three-phase mains via n individually associated variable ratio transformers, n extinction angle control circuits for the individual thyristor bridges, and a total control circuit for controlling the voltage of all thyristor bridges together with respect to voltage. In this system, the output value of the common control circuit constitutes the direct voltage of the inverter station and its independent variable is the transformer stage adjustment which operates in synchronism for all thyristor bridges. The invention also relates to an apparatus for practicing the method.

In the normal use, the direct voltage of a pole of a high voltage direct current transmission system is set in the inverter station. As already noted, this station includes a series connection of n thyrister bridges, each bridge having associated with it a transformer which is variable in stages so as to provide voltage matching. The individual transformers can be controlled in synchronism. If the thyristor voltage drop and the ohmic voltage drops are neglected, the direct voltage $U_{WR}$ for the inverter station is represented as follows, where $\xi$ is the error in the transformer stages from the desired value, with synchronism of the transformers and with the same commutation reactances:

$$U_{WR} = n \cdot 1 \cdot 35 U_S (1 \pm \xi) \sum_{j=1}^{n} \cos\gamma_j - n \frac{I_d}{I_{dN}} D_x,$$

n being the number of thyristor bridges in operation, $U_S$ the secondary voltage at the transformer during idling, $\gamma_j$ (with j=1 . . . n) the extinction angle of the individual thyristor bridges, $I_d$ the average direct current value, $I_{dN}$ the desired direct current value, and $D_x$ the change in the inductive direct voltage.

The extinction angle $\gamma_j$ of each thyristor bridge is regulated separately. In this case, control is effected via the grid control of the thyristor devices. The direct voltage of all thyristor bridges, i.e. of the total system, is regulated by means of a three-point regulator acting on the transformer stages. The three-point regulator supplies one of the three signals "higher", "lower" or "steady" to the transformer stage adjustment. The stage adjustment of the transformers for the bridges in operation is done in synchronism.

Due to this adjustment in discrete and constant steps and for the reason of stabilization the control circuit is affected by a remaining error even in the steady state.

Each bridge can be switched in or out of operation by means of its associated grid control during operation of the system. As soon as a bridge is switched out of operation an associated by-pass switch is closed. The control parameter for the direct voltage regulation via the transformers must then be adapted accordingly. At the same time the circuit gain of the control circuit must also be matched. That gain is determinative of the remaining error in the steady state. The error should be as small as possible.

In principle, such matching can be effected with the aid of return signals from defined switch positions at the beginning or at the end of each switch-on or switch-off operation of a thyristor bridge, e.g. from the by-pass switch. Since the process can extend over a longer period of time, due to the behavior of the system, it is inevitable that errors occur in the stages.

SUMMARY OF THE INVENTION

It is an object of the present invention to eliminate such stage errors.

This and other objects are accomplished according to the present invention in a process of the above-mentioned type, by comparing a measured value which corresponds to the direct bridge voltage of each thyristor bridge with the instantaneous maximum value of the measured values for all thyristor bridges, and, if a measured value differs from the maximum value by more than a predetermined amount, instantaneously switching off the respective thyristor bridge and correspondingly matching the control value for the transformer stage adjustment and the circuit gain of the total control circuit.

Due to the fact that the information for switching the control parameter for the regulation of the total system is derived from the output values of the individual systems, i.e. directly from the individual thyristor bridge voltages, unnecessary adjustments as a result of errors in the transformer stages are advantageously avoided. Better matching to the total system is possible. By switching the circuit gain, it is possible to match the stationary error; it remains constant independently of the number of individual systems.

A preferred embodiment of apparatus for practicing the invention includes a comparator for comparing each measured value with the instantaneous maximum measured value and emitting a switch-off signal for its respective thyristor bridge whenever the predetermined difference is exceeded, and the comparators as a group control the matching in the total control circuit via digital-analog converters.

BRIEF DESCRIPTION OF THE DRAWING

The sole FIGURE is a simplified block circuit diagram of a total control circuit constructed to operate according to a preferred embodiment of the invention.

DESCRIPTION OF THE PREFERRED EMBODIMENTS

The FIGURE illustrates an inverter station connecting a DC-line 17 through a smoothing choke 16 with a three-phase mains 11. The inverter station includes thyristor bridges $1_j$ (j=1 . . . n, here n=4) as well as variable ratio transformers $10_j$ and by-pass switches $14_j$ individually associated with each bridge.

In the operation of the circuit shown in the FIGURE, the voltage of each thyristor bridge $1_j$ is determined by means of a respective voltage divider $15_j$ and is fed via a series-connection of a respective potential separation unit $2_j$ and a respective differential amplifier $4_j$ to a respective comparator $3_j$. Each thyristor bridge $1_j$ is associated with such a comparator $3_j$. The comparison voltage for the comparators is the highest of the voltages of the n thyristor bridges in operation and is provided by a maximum value selection member 5.

Each comparator $3_j$ is set to switch its output state when the voltage of its associated thyristor bridge falls below, for example, 30% of the comparison voltage. The described voltage reduction can be achieved by individually regulating the thyristor bridge $1_j$ by grid control.

The setting for the switching point of the comparators can be effected within wide limits.

The comparators $3_j$ together control a common digital-analog converter 6 which effects regulation of a control parameter w for the transformer stage changes, while obtaining a preselectable voltage value at resistor 12 fed by an auxiliary constant voltage $U_B$. The error of control parameter w from a control value x corresponding to the instantaneous voltage of the inverter station obtained by a voltage divider 18 through a potential separation unit 19, is fed via a control amplifier 7 to a second digital-analog converter 8 which matches the circuit gain of the total control circuit to the respective transformer stage arrangement.

The digital-analog converters 6 and 8 are operational amplifiers. Their external resistance-network and in consequence their gain is varied by the binary signals derived from the comparators $3_j$.

The transformer adjustment is then effected via a three-point regulator 9 by the output signals from the second digital-analog converter 8. The three-point regulator 9 provides, in response to the information received from converter 8, one of the signals "higher", "lower" or "steady" to a common transformer stage adjustment 13 which in synchronism adjusts the ratio of the transformers $10_j$ for the bridges in operation.

When the bridge is switched off, the respective bypass switch $14_j$ is closed while the control parameter is reduced and the circuit gain is raised, and vice versa for switching on. With this matching of the total control circuit without any delay in time, errors in the transformer stage adjustment are substantially avoided.

It will be understood that the above description of the present invention is susceptible to various modifications, changes and adaptations, and the same are intended to be comprehended within the meaning and range of equivalents of the appended claims.

What is claimed is:

1. A method for matching the control arrangement for the direct voltage of an inverter station to the control path, in which the inverter station includes a plurality of thyristor bridges which are connected in series at their direct voltage side and connected to a three-phase mains via a plurality of variable ratio transformers each individually associated with a respective thyristor bridge, a plurality of extinction angle circuits each associated with a respective thyristor bridge, and a total control circuit for controlling the voltage of all thyristor bridges together, the control circuit providing an output corresponding to the direct voltage of the inverter station and responding to a setting value representative of the transformer stage adjustment which operates in synchronism for all thyristor bridges, said method comprising: comparing a measured value which corresponds to the direct bridge voltage of each thyristor bridge with the instantaneous maximum value of the measured values for all thyristor bridges; and, whenever a measured value differs from the maximum value by more than a predetermined amount, instantaneously switching off the respective thyristor bridge and correspondingly matching the control value for the transformer stage adjustment and the circuit gain of the total control circuit.

2. Apparatus for matching the control arrangement for the direct voltage of an inverter station to the control path, in which the inverter station includes a plurality of thyristor bridges which are connected in series at their direct voltage side and connected to a three-phase mains via a plurality of variable ratio transformers each individually associated with a respective thyristor bridge, a plurality of extinction angle circuits each associated with a respective thyristor bridge, and a total control circuit for controlling the voltage of all thyristor bridges together, the control circuit providing an output corresponding to the direct voltage of the inverter station and responding to a setting value representative of the transformer stage adjustment which operates in synchronism for all thyristor bridges, said apparatus comprising: a plurality of comparators each connected for comparing a measured value which corresponds to the direct bridge voltage of a respective thyristor bridge with the instantaneous maximum value of the measured values for all thyristor bridges, and for emitting a switch-off signal for its respective thyristor bridge whenever the measured value for its respective bridge differs from the maximum value by more than a predetermined amount, and digital-analog converter means connected to said plurality of comparators for matching the conrol value for the transformer stage adjustment and the circuit gain of the total control circuit.

* * * * *